United States Patent
Rives et al.

(10) Patent No.: US 10,298,725 B2
(45) Date of Patent: May 21, 2019

(54) SYNCHRONOUS DIGITAL SIGNAL ENCAPSULATION

(71) Applicant: Adtran, Inc., Huntsville, AL (US)

(72) Inventors: Eric Malcolm Rives, Owens Cross Roads, AL (US); Joseph L. Boyd, Huntsville, AL (US); Andrew T. Ruble, Athens, AL (US)

(73) Assignee: Adtran Inc., Huntsville, AL (US)

( * ) Notice: Subject to any disclaimer, the term of this patent is extended or adjusted under 35 U.S.C. 154(b) by 125 days.

(21) Appl. No.: 14/938,424

(22) Filed: Nov. 11, 2015

(65) Prior Publication Data

US 2017/0134341 A1 May 11, 2017

(51) Int. Cl.
*H04L 29/06* (2006.01)
*H04L 29/08* (2006.01)
*H04J 3/06* (2006.01)
*H04L 12/46* (2006.01)
*H04L 29/12* (2006.01)

(52) U.S. Cl.
CPC .......... *H04L 69/324* (2013.01); *H04J 3/0658* (2013.01); *H04L 12/4633* (2013.01); *H04L 67/10* (2013.01); *H04L 61/6022* (2013.01); *H04L 69/22* (2013.01)

(58) Field of Classification Search
CPC ... H04J 3/0658; H04J 3/0673; H04L 12/2898; H04L 12/4608; H04L 61/2592; H04L 61/6022; H04L 69/32; H04L 69/324; H04L 12/4633; H04L 67/10; H04L 69/22; H04M 3/005; H04M 3/007
See application file for complete search history.

(56) References Cited

U.S. PATENT DOCUMENTS

| | | | |
|---|---|---|---|
| 6,850,513 B1* | 2/2005 | Pelissier | H04L 45/302 370/351 |
| 7,006,532 B1* | 2/2006 | Kathail | H04L 69/32 370/351 |
| 2002/0021694 A1* | 2/2002 | Benayoun | H04L 12/4608 370/386 |
| 2002/0112109 A1* | 8/2002 | Jorgenson | G06F 13/409 710/305 |
| 2005/0243839 A1* | 11/2005 | Raut | H04L 45/04 370/395.54 |
| 2014/0269259 A1* | 9/2014 | Vvr | H04L 12/2898 370/221 |
| 2015/0319312 A1* | 11/2015 | Kuipers | H04M 3/007 379/93.01 |

* cited by examiner

*Primary Examiner* — Khoa Huynh
(74) *Attorney, Agent, or Firm* — Fish & Richardson P.C.

(57) ABSTRACT

Methods and apparatus for communicating synchronous digital signals through an asynchronous domain are disclosed. In one aspect a method includes receiving a first synchronous digital signal of a first domain, wherein the first synchronous digital signal is generated by a first device for communication to a second device; encapsulating the first synchronous digital signal of the first domain into a first asynchronous packet of a second domain; and transmitting the first asynchronous packet to an asynchronous network of the second domain.

16 Claims, 7 Drawing Sheets

SYNCHRONOUS DIGITAL SIGNAL ENCAPSULATION

TECHNICAL FIELD

This specification relates generally to telecommunications and more specifically to communicating synchronous digital signals through an asynchronous domain.

BACKGROUND

High-level Data Link Control (HDLC) is a general purpose data link control protocol. HDLC is a bit-oriented synchronous data link layer that uses synchronous digital signals for communication. The data is organized into units called frames and is sent to specified destinations.

HDLC is used for point-to-point and multipoint data links in telecommunication and computer networks. Often, HDLC devices are connected to each other by digital buses. HDLC manages the pace at which data is transmitted on a synchronous digital bus or other synchronous digital link.

SUMMARY

In general, one innovative aspect of the subject matter described in this specification can be embodied in methods that include the operations of receiving a first synchronous digital signal of a first domain, where the first synchronous digital signal is generated by a first device for communication to a second device; encapsulating the first synchronous digital signal of the first domain into a first asynchronous packet of a second domain; and transmitting the first asynchronous packet to an asynchronous network of the second domain.

These and other embodiments can each optionally include one or more of the following features. The first asynchronous packet can include a destination address and the destination address can be based on an address associated with the second device. The address associated with the second device can be a media access control (MAC) address. The address associated with the second device can include at least one of an address of the second device, an address of a different inter-domain node connected to the second device, or an address of a transmit buffer associated with a synchronous digital bus connected to the second device.

Methods can include the operations of receiving the first synchronous digital signal of the first domain from a synchronous digital bus connected to the first device; receiving additional synchronous digital signals of the first domain from the synchronous digital bus; encapsulating the first asynchronous digital signal and the additional synchronous digital signals into a different asynchronous packet of the second domain; and transmitting the different asynchronous packet to the asynchronous network of the second domain. The first domain can be a high-level data link control (HDLC) domain, the second domain can be an Ethernet domain, the synchronous digital signal can be an HDLC signal, and the asynchronous packet can be an Ethernet packet.

Methods can also include the operations of receiving a second asynchronous packet of the second domain, where the second asynchronous packet includes a second synchronous digital signal of the first domain and the second synchronous digital signal is generated by the second device for communication to the first device; decapsulating the second synchronous digital signal from the second asynchronous packet; and transmitting the second synchronous digital signal to the first device. Methods may include the operations of classifying, by the inter-domain node, the second synchronous digital signal within the second asynchronous packet to a transmit buffer associated with a synchronous digital bus connected to the first device. Methods may also include the operations of aligning a timing of the second synchronous digital signal to a timing of the first domain using a transmit buffer.

A second innovative aspect of the subject matter described in this specification can be embodied in devices that include one or more computer processors, and memory storage connected to the processors and storing instructions that, when executed by the one or more processors, perform operations that include receiving a first synchronous digital signal of a first domain, where the first synchronous digital signal is generated by a first device for communication to a second device; deserializing the first synchronous digital signal via a serial-to-parallel operation, where the serial-to-parallel operation includes taking data serially from one input port and outputting the data simultaneously at multiple output ports; encapsulating the deserialized first synchronous digital signal into a first asynchronous packet of a second domain; and transmitting the first asynchronous packet to an asynchronous network of the second domain.

These and other embodiments can each optionally include one or more of the following features. The first asynchronous packet can include a destination address and the destination address can be based on an address associated with the second device. The address associated with the second device can be a MAC address. The address associated with the second device can include at least one of an address of the second device, an address of a different inter-domain node connected to the second device, or an address of a transmit buffer associated with a synchronous digital bus connected to the second device.

The one or more processors of devices can perform operations that include receiving the first synchronous digital signal of the first domain from a synchronous digital bus connect to the first device; receiving additional synchronous digital signals of the first domain from the synchronous digital bus; encapsulating the first asynchronous digital signal and the additional synchronous digital signals into a different asynchronous packet of the second domain; and transmitting the different asynchronous packet to the asynchronous network of the second domain. The first domain can be a high-level data link control (HDLC) domain, the second domain can be an Ethernet domain, the synchronous digital signal can be an HDLC signal, and the asynchronous packet can be an Ethernet packet.

The one or more processors of devices can also perform operations that include receiving a second asynchronous packet of the second domain, where the second asynchronous packet includes a second synchronous digital signal of the first domain and the second synchronous digital signal is generated by the second device for communication to the first device; decapsulating the second synchronous digital signal from the second asynchronous packet; aligning a timing of the second synchronous digital signal to a timing of the first domain using a transmit buffer; serializing the time-aligned second synchronous digital signal via a parallel-to-serial operation, where the parallel-to-serial operation includes taking data from multiple input ports and outputting the data in serial at one output port; and transmitting the second synchronous digital signal to the first device. The one or more processors may perform operations that include classifying the second synchronous digital signal within the second asynchronous packet to a transmit buffer associated with a synchronous digital bus connected to the first device. The one or more processors may also perform operations that include storing the deserialized first synchronous digital signal in a receive buffer.

A third innovative aspect of the subject matter described in this specification can be embodied in methods that include the operations of receiving synchronous digital signals of a first domain from a first synchronous digital bus; encapsulating, by the first inter-domain node, the synchronous digital signals into an asynchronous packet of a second domain; transmitting the asynchronous packet to a second inter-domain node across the asynchronous network; decapsulating, by the second inter-domain node, the synchronous digital signals from the asynchronous packet; and transmitting the synchronous digital signals to a second synchronous digital bus. The first domain can be a high-level data link control (HDLC) domain, the second domain can be an Ethernet domain, the synchronous digital signals can be HDLC signals, the synchronous digital bus can be an HDLC bus, the asynchronous packet can be an Ethernet packet, and the asynchronous network can be an Ethernet network.

The disclosure is directed to a synchronous digital signal encapsulation system and method. The synchronous digital signal encapsulation system may allow two remote devices to communicate across an asynchronous network using synchronous digital signals native to the devices, domain of the devices, or a combination thereof. In some aspects, the synchronous digital signal encapsulation system may transmit an aggregated synchronous digital signal from a synchronous digital bus across an asynchronous network to save network resources. The synchronous digital signal encapsulation system may also, in some aspects, virtually connect or otherwise extend geographically distributed synchronous digital buses or devices. For example, devices connected to different synchronous digital buses at distributed locations may communicate with each other as if the devices are on the same synchronous digital bus, although there is no direct synchronous digital link between the devices to deliver the synchronous digital signals. Virtually extending a synchronous digital bus to geographically distributed locations may permit some devices or functions to be centralized and/or moved into a centralized resource cloud and facilitate technologies such as software defined network (SDN) and network function virtualization (NFV).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The present disclosure is directed to remote synchronous digital devices communicating without a direct synchronous digital connection or bus. For example, synchronous digital signals may be encapsulated and communicated through an asynchronous network to deliver the synchronous digital signals to a remote synchronous digital device. One example of a synchronous digital device is a high-level data link control (HDLC) device. In some instances, one HDLC device may communicate with another HDLC device and the two devices are connected via an asynchronous network such as an Ethernet network without using an HDLC link to directly deliver the HDLC signals.

In this specification, HDLC signal refers to both Layer 2 HDLC frame per International Standards Organization (ISO) 7-layer model and Layer 1 physical signal that comprises the Layer 2 HDLC frame.

The following disclosure describes several techniques for transmitting a synchronous digital signal of a first domain across an asynchronous network of a second domain. In some implementations, the synchronous digital signal (e.g., an HDLC signal or an HDLC-formatted signal) of the first domain (e.g., the HDLC domain) may be encapsulated in an asynchronous packet (e.g., an Ethernet packet) of the second domain (e.g., the Ethernet domain) and transmitted across the asynchronous network of the second domain (e.g., an Ethernet network). The asynchronous packet may include a destination address associated with a target device. For example, at a first inter-domain node, the HDLC signal generated by a source HDLC device may be encapsulated in an Ethernet packet. The Ethernet packet may be delivered to a second inter-domain node using the destination address included in the Ethernet packet. At the second inter-domain node, the Ethernet packet may be decapsulated to retrieve the HDLC signal, which is then sent to the target HDLC device.

In some implementations, multiple devices may be connected to a synchronous digital bus and an aggregated synchronous digital signal from the synchronous digital bus may be encapsulated in an asynchronous packet. For example, an aggregated HDLC signal from an HDLC bus may be a combination of the HDLC signals from the multiple HDLC devices connected with the HDLC bus. The aggregated HDLC signal from the HDLC bus may be encapsulated in an Ethernet packet and transmitted across the Ethernet network.

By encapsulating the signals, geographically distributed synchronous digital buses may be virtually connected. Devices connected to different synchronous digital buses at distributed locations can communicate with each other as if the devices are on the same synchronous digital bus, even if there is no synchronous digital link between the different synchronous digital buses to directly deliver synchronous digital signals. For example, HDLC devices connected with geographically distributed HDLC buses can communicate with each other as if there are HDLC links between the HDLC devices. In some implementations, some devices such as an HDLC primary device may be moved into a centralized resource cloud to facilitate technologies such as software defined network (SDN) and network function virtualization (NFV).

Figure 1:
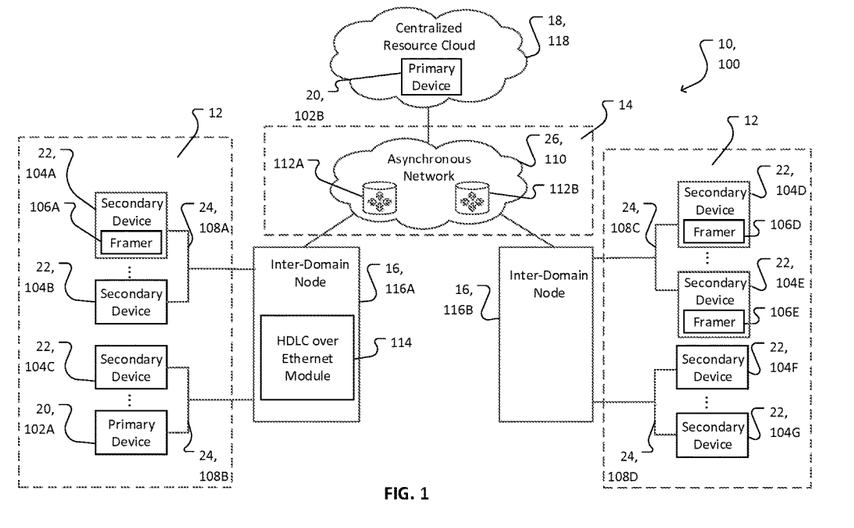
FIG. 1 is a schematic diagram showing aspects of an example communications system.

FIG. 1 is a schematic diagram showing aspects of an example communications system 10. The example communications system 10 includes a first domain 12 and a second domain 14 coupled together by inter-domain nodes 16. The first domain 12 may be a synchronous digital domain where devices communicate using synchronous digital signals. The second domain 14 may be an asynchronous domain where devices communicate using asynchronous signals. The inter-domain nodes 16 may encapsulate and decapsulate packets between the first domain 12 and the second domain 14. For example, the encapsulation may include inserting the synchronous digital signal of the first domain into an asynchronous packet of the second domain. The decapsulation may include extracting the synchronous digital signal of the first domain from the asynchronous packet of the second domain.

The communications system 10 may further include a centralized resource cloud 18 that houses various computing resources such as computer systems, components and devices to facilitate resource sharing. The centralized resource cloud 18 may connect directly or indirectly to the communication networks of the first domain 12 and the second domain 14 so that the devices in the centralized resource cloud 18 can communicate with the devices outside the centralized resource cloud 18 via the other communication networks. The centralized resource cloud 18 may be in the first domain 12 or in the second domain 14. If the centralized resource cloud 18 connects to a communication network that is in a different domain, an inter-domain node 16 may be used to encapsulate and decapsulate the communications between the two different domains. The communications system 10 can include additional or different components and features and can be configured in a different manner than the example system 10 shown in FIG. 1. For example, two inter-domain nodes 16 are shown in FIG. 1 for clarity and brevity, but many different inter-domain nodes can be included in the system 10.

Referring to FIG. 1, the first domain 12 may comprise primary devices 20 coupled to secondary devices 22 by communications links 24. A primary device 20 is a device that controls or hosts another device, sometimes called a master device. A secondary device 22 is a device that is controlled or hosted by another device, sometimes called a slave device. In one implementation, the communication link 24 may be a synchronous digital bus, and the primary devices 20 and secondary devices 22 may be synchronous digital devices locally communicating over the synchronous digital bus. The second domain 14 may comprise a local, large area or other suitable network. For example, the second domain 14 may comprise an asynchronous network 26 which communicates asynchronous packets.

In an implementation where the first domain is an HDLC domain and the second domain is an Ethernet domain, an example communications system 100 in FIG. 1 illustrates that the primary devices 20 may comprise HDLC primary devices (or HDLC hosts) 102A-102B, the secondary devices 22 may comprise HDLC secondary devices 104A-104G, and the communications links 24 may comprise HDLC buses 108A-108D.

HDLC primary devices, or hosts, 102A-102B and HDLC secondary devices 104A-104G may also be referred to as HDLC devices. The HDLC devices generate HDLC signals based on the HDLC protocol, which is a synchronous digital data link layer protocol that sends data in a continuous stream at a constant rate. The transmitter and receiver of an HDLC signal may be synchronized in time so that the receiver can sample the received signal at the same time intervals that were used by the transmitter. In some cases, HDLC signals can be generated by application specific integrated circuit (ASIC), field-programmable gate array (FPGA) components or other logic circuitry that may produce digital signals. Thus an HDLC signal can be a synchronous digital signal.

The HDLC protocol may be used for point to multipoint communications. The HDLC devices may work in a primary-secondary mode. For example, one HDLC primary device (i.e., the primary) may communicate with multiple HDLC secondary devices (i.e., the secondary) and the HDLC primary device may give the HDLC secondary devices permission to transmit frames on the shared bus.

An HDLC device may include a framer. For example, the HDLC secondary devices 104A, 104D, and 104E may include a framer 106A, 106D, and 106E, respectively. The framers 106A, 106D, and 106E may format HDLC signals into HDLC frames. In some cases, the framers 106A, 106D, and 106E can be a symmetrical high-bit rate digital subscriber line (SHDSL) framer that generates frames with HDLC signals or HDLC-formatted signals.

An HDLC frame may include various information fields such as an HDLC header, an HDLC payload to carry data, and an HDLC frame check sequence (FCS) that permits the receiver to detect errors that may have been induced during the transmission of the HDLC frame. The HDLC header may also include an address field to carry the address information of the device associated with the HDLC frame and a control field to carry control information.

Multiple HDLC devices can be connected to an HDLC bus to communicate with each other. The HDLC bus can be a synchronous digital bus to deliver synchronous digital signals such as HDLC signals. As illustrated in FIG. 1, the HDLC secondary devices 104A and 104B are connected to the HDLC bus 108A, the HDLC secondary device 104C and the HDLC primary device 102A are connected to the HDLC bus 108B, the HDLC secondary devices 104D and 104E are connected to the HDLC bus 108C, and the HDLC secondary devices 104F and 104G are connected to the HDLC bus 108D.

In the HDLC/Ethernet implementation, the second domain 14 may comprise an asynchronous network such as an Ethernet network 110. The Ethernet network 110 may include multiple Ethernet switches such as 112A and 112B to deliver data. Data transmitted over the Ethernet network 110 can be carried in Ethernet packets. The Ethernet network may be an asynchronous network in that the data can be transmitted intermittently rather than in a steady stream. Timing information to recover data from the Ethernet packet may be encoded within the Ethernet packet, and the transmitter and receiver may not have to be synchronized in time. Therefore, an Ethernet packet can be an asynchronous packet.

An Ethernet packet may include various information fields, for example, a source address field including a media access control (MAC) address of the source device for the Ethernet packet, a destination address field including a MAC address of the destination device for the Ethernet packet, an Ethernet type and protocol field indicating which protocol is used for the payload of the Ethernet packet, a payload field to carry data, and an Ethernet FCS that may permit the receiver to detect errors that may have been induced during the transmission of the Ethernet packet across the Ethernet network.

In the HDLC/Ethernet implementation, the inter-domain nodes 16 may comprise inter-domain nodes 116A and 116B which perform operations on communications between the HDLC domain and the Ethernet domain. The inter-domain nodes 116A and 116B may connect the HDLC devices 102A, 102B, and 104A-104G with the Ethernet network 110 and perform packet encapsulation and decapsulation between an HDLC domain and an Ethernet domain. The inter-domain nodes 116A and 116B may connect with the HDLC devices 102A, 102B, and 104A-104G via synchronous digital buses such as the HDLC buses 108A-108D. In some cases, an inter-domain node may connect to multiple HDLC buses. For example, the inter-domain node 116A connects to HDLC buses 108A and 108B. In some cases, the inter-domain nodes 116A and 116B with may comprise an HDLC over Ethernet module 114 which performs packet encapsulation and decapsulation.

The inter-domain nodes 116A and 116B may receive the HDLC signal generated by the HDLC device via the HDLC bus, encapsulate the HDLC signal into an Ethernet packet, and send the Ethernet packet to the Ethernet network 110. The encapsulation may be performed by inserting the HDLC frame into the payload field of the Ethernet packet. The encapsulation may be further performed by including other Ethernet information fields such as a MAC source address, a MAC destination address, an Ethernet type and protocol field, and an Ethernet FCS.

In some cases, the MAC source address of the Ethernet packet may be the MAC address of the inter-domain node that performs the encapsulation for the source HDLC device. In some cases, as discussed below, the MAC source address may be the MAC address of a receive buffer associated with a synchronous digital bus to which the source HDLC device connects, if the receive buffer has a MAC address.

In some cases, the MAC destination address of the Ethernet packet may be the MAC address of the target HDLC device if the target HDLC device is Ethernet capable and has a MAC address. In some cases, the MAC destination address may be the MAC address of the inter-domain node connected with the target HDLC device that may perform the decapsulation for the target device. In some cases, as discussed in detail below, the MAC destination address may be the MAC address of a transmit buffer associated with the synchronous digital bus to which the target HDLC device connects, if the transmit buffer has a MAC address. The Ethernet packet may be delivered across the Ethernet network 110 based on the MAC destination address of the Ethernet packet.

In the HDLC/Ethernet implementation, the inter-domain nodes 116A and 116B may receive the Ethernet packet from the Ethernet network 110, decapsulate the Ethernet packet by extracting the HDLC frame from the Ethernet packet, and send the extracted HDLC frame to the target HDLC device via the HDLC bus.

The inter-domain nodes 116A and 116B may connect to multiple synchronous digital buses such as HDLC buses. When receiving an Ethernet packet from the Ethernet network 110, the inter-domain node may, based on the MAC destination address of the Ethernet packet, classify the Ethernet packet to the HDLC bus associated with the target HDLC device. Classifying the Ethernet packet to the HDLC bus associated with the target HDLC device may be performed either before or after decapsulating the Ethernet packet.

In the HDLC/Ethernet implementation, the centralized resource cloud 18 may comprise a resource cloud 118 that includes HDLC devices such as the HDLC primary device 102B. The HDLC primary device 102B may control or host secondary devices that are inside or outside of the resource cloud 118. The resource cloud 118 may, based on demand, dynamically configure the HDLC primary device 102B using a pool of resources in the cloud. For example, if the HDLC primary device 102B hosts a large number of secondary devices, the resource cloud 118 may configured an HDLC primary device with additional processing resources. The resource cloud 118 may also dynamically create an HDLC primary device 102B when there are new secondary devices to be hosted and dynamically decommission the HDLC primary device 102B when there is no need of the device.

As illustrated in FIG. 1, the HDLC primary device 102B may be an Ethernet-capable primary device and may directly connect to the Ethernet network 110. An Ethernet-capable primary device is able to perform encapsulation and decapsulation of the communications between the HDLC domain and the Ethernet domain. If the HDLC primary device 102B is not Ethernet-capable, the HDLC primary device 102B may connect to the Ethernet network 110 via an inter-domain node.

In some cases, HDLC primary device 102B may be an Ethernet-capable primary device operable to provision a plurality of SHDSL framers that reside at a remote end of an Ethernet network, e.g., the Ethernet-capable primary device 102B to provision HDLC secondary devices 104D and 104E with SHDSL framers. The Ethernet-capable primary device 102B may encapsulate the HDLC-formatted provisioning message in an Ethernet packet and send the Ethernet packet through the Ethernet network 110. In some cases, the MAC destination address of the Ethernet packet may be the MAC address of the inter-domain node 116B that is connected to the HDLC secondary devices 104D and 104E. Upon receiving the Ethernet packet, the inter-domain node 116B may extract the HDLC-formatted provisioning message and forward the extracted message to the HDLC secondary devices 104D and 104E with SHDSL framers. Conversely, the inter-domain node 116B may encapsulate the HDLC-formatted client response from HDLC secondary devices 104D and 104E with SHDSL framers into an Ethernet packet and send the Ethernet packet back to the Ethernet-capable primary device 102B. The MAC destination address of the Ethernet packet may be the MAC address of the primary device 102B since the primary device 102B is Ethernet-capable and has a MAC address.

In operation, the HDLC devices at geographical distributed locations can communicate with each other even if there are no HDLC links between the HDLC devices to deliver HDLC signals. For example, the HDLC primary device 102A, which is at one location, can send HDLC signals to the HDLC secondary devices 104D-104G, which are at another location, by the inter-domain node 116A encapsulating the HDLC signals into Ethernet packets and the inter-domain node 116B extracting the HDLC signals from the Ethernet packets. For another example, the HDLC primary device 102B in the resource cloud 118 can communicate with the HDLC secondary devices outside the resource cloud 118 such as HDLC secondary devices 104A-104G. When the HDLC primary device 102B communicates with the HDLC secondary device 104A-104G, the HDLC primary device 102B may generate an Ethernet packet that includes the HDLC signal. Upon receiving the Ethernet packet, the inter-domain node 116B may decapsulate the Ethernet packet and deliver the HDLC signal to the HDLC secondary devices 104A-104B.

The inter-domain nodes 116A and 116B may in one implementation packetize the signal from an entire synchronous digital bus by encapsulating the aggregated HDLC signal from the HDLC bus into an Ethernet packet. The aggregated HDLC signal may include the HDLC signals from individual HDLC devices connected to the HDLC bus. For example, the aggregated HDLC signal may be formed by cascading the HDLC signals from individual HDLC devices that are connected to the HDLC bus. For example, the inter-domain node 116B may encapsulate the aggregated HDLC signal from the HDLC bus 108C into an Ethernet packet and send the Ethernet packet to the HDLC primary device 102B in the resource cloud 118. Instead of individually packetizing the HDLC signals from the HDLC secondary devices 104D and 104E and sending multiple Ethernet packets over the network, packetizing the aggregated HDLC signal from an entire bus into one Ethernet packet and sending the one Ethernet packet across the network may save network resources.

Figure 2:
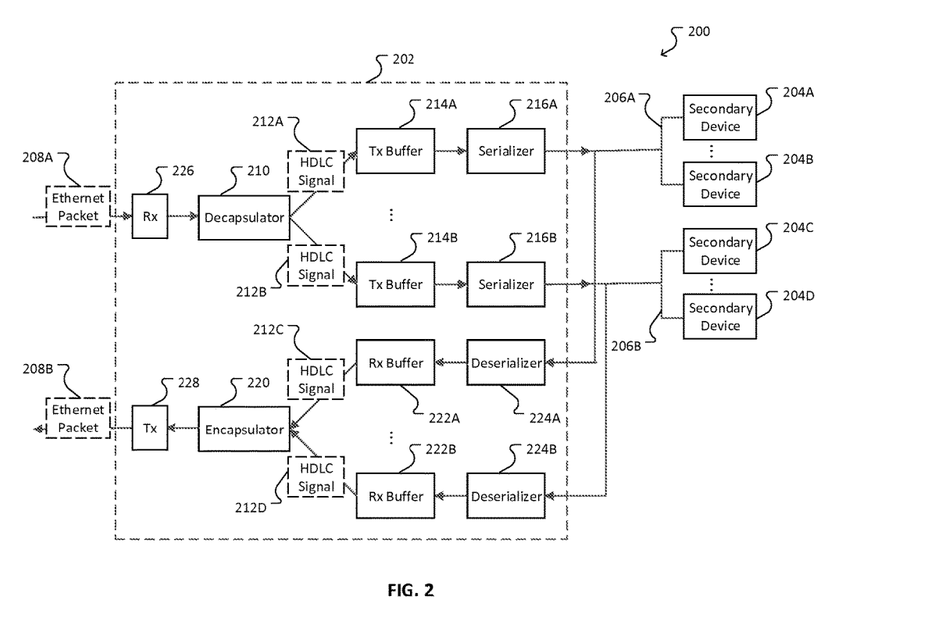
FIG. 2 is a block diagram of an inter-domain node according to an HDLC/Ethernet implementation.

FIG. 2 is a block diagram illustrating an inter-domain node 202 according to an HDLC/Ethernet implementation. The inter-domain node 202 may be implemented by one or more processors or circuits. In some cases, the inter-domain node 202 may be implemented in an FPGA device or other integrated circuit. The inter-domain node may encapsulate and decapsulate or otherwise process other types of signals such as synchronous optical networking (SONET) signals or synchronous digital hierarchy (SDH) signals. The inter-domain node 202 is connected to HDLC secondary devices 204A and 204B via an HDLC bus 206A and is connected to HDLC secondary devices 204C and 204D via an HDLC bus 206B. The inter-domain node 202 may include a receiver 226 to receive an incoming Ethernet packet 208A, a decapsulator 210 that may extract an HDLC signal 212A or 212B from the incoming Ethernet packet 208A, transmit buffers 214A and 214B that may store and align timing of the extracted HDLC signals 212A and 212B, and serializers 216A and 216B that may perform parallel-to-serial operations on the time-aligned HDLC signals. The transmit buffer 214A and the serializer 216A may be associated with the HDLC bus 206A, and the transmit buffer 214B and the serializer 216B may be associated with the HDLC bus 206B. The inter-domain node 202 may also include deserializers 224A and 224B that may perform serial-to-parallel operations on the received HDLC signals from the HDLC buses 206A and 206B, receive buffers 222A and 222B that may store the deserialized HDLC signals, an encapsulator 220 that encapsulates the HDLC signal 212C or 212D into an outgoing Ethernet packet 208B, and a transmitter 228 to transmit the outgoing Ethernet packet 208B to an asynchronous network such as the Ethernet network 110. The receive buffer 222A and the deserializer 224A may be associated with the HDLC bus 206A, and the receive buffer 222B and the deserializer 224B may be associated with the HDLC bus 206B. The components in the inter-domain node 202 may be connected by communication links such as shared or dedicated communication links.

In the operation of decapsulation, the decapsulator 210 decapsulates the incoming Ethernet packet 208A by extracting the HDLC signal 212A or 212B (i.e., the HDLC frame) from the Ethernet packet 208A. In some cases, the decapsulation may be performed by extracting the HDLC signal 212A or 212B from the payload field of the Ethernet packet 208A.

In some cases, if the inter-domain node 202 is connected to multiple HDLC buses such as 206A and 208B, the decapsulator 210 may classify the incoming Ethernet packet 208A based on the destination address of the Ethernet packet 208A and determine to which HDLC bus the HDLC signal included in the Ethernet packet 208A is intended. The decapsulator 210 may then send the extracted HDLC signal to the transmit buffer associated with the intended HDLC bus. For example, if the incoming Ethernet packet 208A includes an HDLC signal 212A intended for an HDLC device 204A or 204B that is connected to the HDLC bus 206A, the destination address included in the Ethernet packet 208A may be an address of the transmit buffer 214A that is associated with the HDLC bus 206A. In some cases, the transmit buffer 214A may have a MAC address. Based on the destination address of the Ethernet packet, the decapsulator 210 may send the extracted HDLC signal 212A to the transmit buffer 214A.

The transmit buffers 214A and 214B may buffer the extracted HDLC signals 212A and 212B and align the timings of the HDLC signals 212A and 212B to the timings of the secondary devices 204A-204D that are intended to receive the HDLC signals. As discussed above, the HDLC signal may be a synchronous digital signal and the transmitter and the receiver of the HDLC signal may be synchronized. In some cases, the transmit buffers 214A and 214B may buffer the extracted HDLC signals 212A and 212B to align the timings of the HDLC signals 212A and 212B to the timings of the HDLC buses 206A and 206B that the HDLC secondary devices 204A-204D are associated with.

The serializer 216A and 216B may perform parallel-to-serial operations on the extracted HDLC signals and send the serialized HDLC signals to the HDLC buses 206A and 206B. The parallel-to-serial operation may include taking data from multiple input ports and outputting the data in serial form at one output port. The HDLC buses 206A and 206B may further deliver the HDLC signals to the secondary devices 204A-204D. In some cases, the parallel-to-serial operation may be performed after the transmit buffer 214A or 214B has collected the entire HDLC signal extracted from the Ethernet packet.

In the operation of encapsulation, the HDLC signals generated by the secondary devices 204A-204D may be received at the deserializers 224A and 224B via the respective HDLC buses 206A and 206B. The deserializers 224A and 224B may perform serial-to-parallel operations on the received HDLC signals and send the deserialized HDLC signals to the respective receive buffers 222A and 222B. The serial-to-parallel operation may include taking data serially from one input port and outputting the data simultaneously at multiple output ports. The deserialized HDLC signals may be stored at the receive buffers 222A and 222B for the encapsulator 220 to perform packet encapsulation.

The encapsulator 220 may receive the HDLC signal 212C or 212D from the receive buffer 222A or 222B. For example, the receive buffer 222A or 222B may send the HDLC signal 212C or 212D to the encapsulator 220. In some cases, the encapsulator 220 may fetch the HDLC signal 212C or 212D from the receive buffer 222A or 222B.

The encapsulator 220 may encapsulate the HDLC signal 212C or 212D into the outgoing Ethernet packet 208B. In some cases, the encapsulation may be performed by inserting the HDLC signal 212C or 212D into the payload field of the Ethernet packet 208B. The encapsulation may be further performed by including other Ethernet information fields such as a MAC source address, a MAC destination address, an Ethernet type and protocol field, and an Ethernet FCS.

In some cases, the MAC source address of the Ethernet packet may be the MAC address of the inter-domain node 202 that performs the encapsulation. In some cases, if the receive buffer has a MAC address, the MAC source address may be the MAC address of the receive buffer 222A or 222B associated with the HDLC bus 206A or 206B. In case of the inter-domain node connecting to multiple HDLC buses, using the address of the receive buffer may provide information about the HDLC bus that the source HDLC device connects to. In case of packetizing an entire HDLC bus, using the address of the receive buffer may provide information about the HDLC bus that is being packetized.

In some cases, the MAC destination address of the Ethernet packet may be the MAC address of the target HDLC device if the target HDLC device is Ethernet capable with a MAC address. For example, in FIG. 1, if the HDLC secondary device 104D sends an HDLC signal to the HDLC primary device 102B, the MAC destination address of the Ethernet packet can be the MAC address of the HDLC primary device 102B. In some cases, the MAC destination address may be the MAC address of the inter-domain node connected with the target HDLC device. For example, in FIG. 1, if the HDLC secondary device 104D sends an HDLC signal to the HDLC primary device 102A, the MAC destination address of the Ethernet packet can be the MAC address of the inter-domain node 116A. In some cases, the MAC destination address may be the MAC address of a transmit buffer associated with the HDLC bus of the target HDLC device if the transmit buffer has a MAC address. For example, in FIG. 1, if the HDLC primary device 102B sends an HDLC signal to the HDLC secondary device 104D, the MAC destination address of the Ethernet packet can be the MAC address of the transmit buffer within the inter-domain node 116B that is associated with the HDLC bus 108C. In case of the inter-domain node connecting to multiple HDLC buses, using the address of the transmit buffer may provide information of the HDLC bus that the target HDLC device connects to. The Ethernet packet may be delivered across the Ethernet network 110 based on the MAC destination address of the Ethernet packet.

In operation, upon receiving the incoming Ethernet packet 208A at the inter-domain node 202, the decapsulator 210 may extract the HDLC signal 212A or 212B from the Ethernet packet 208A. The decapsulator 210 may examine the MAC destination address of the Ethernet packet 208A. If the inter-domain node 202 connects to one HDLC bus and the MAC destination address of the Ethernet packet 208A is the MAC address of the inter-domain node 202, the decapsulator 210 may send the extracted HDLC signal to the transmit buffer connected to the HDLC bus. If the inter-domain node 202 connects to multiple HDLC buses and the MAC destination address of the Ethernet packet 208A is the MAC address of the transmit buffer 214A or 214B, the decapsulator 210 may send the extracted HDLC signal to the corresponding transmit buffer. The transmit buffer 214A or 214B may align the timing of the HDLC signal 212A or 212B to the timing of the HDLC bus that is intended to receive the HDLC signal. The serializer 216A or 216B may perform a parallel-to-serial operation on the time-aligned HDLC signal and send the serialized HDLC signal to the HDLC bus 206A or 206B. The HDLC bus 206A or 206B may further deliver the HDLC signal to one of the secondary devices 204A-204D based on the address information within the HDLC signal, as discussed below.

When one of the secondary devices 204A-204D has an HDLC signal to send, the deserializer 224A or 224B receives the HDLC signal via the HDLC buses 206A or 206B. In some cases, the deserializer 224A or 224B may receive the aggregated HDLC signal from the HDLC bus 206A or 206B. The aggregated HDLC signal may include the HDLC signals from individual HDLC devices connected to the HDLC bus. The deserializer 224A or 224B may perform a serial-to-parallel operation on the received HDLC signal and send the deserialized HDLC signal to the receive buffer 222A or 222B. The receive buffer 222A or 222B may send the HDLC signal 212C or 212D to the encapsulator 220. The encapsulator 220 may encapsulate the HDLC signal 212C or 212D into the outgoing Ethernet packet 208B. In some cases, the encapsulation may be performed by inserting the HDLC signal 212C or 212D into the payload field of the Ethernet packet 208B. The encapsulation may be further performed by including other Ethernet information fields such as a MAC source address, a MAC destination address, an Ethernet type and protocol field, and an Ethernet FCS.

Figure 3:
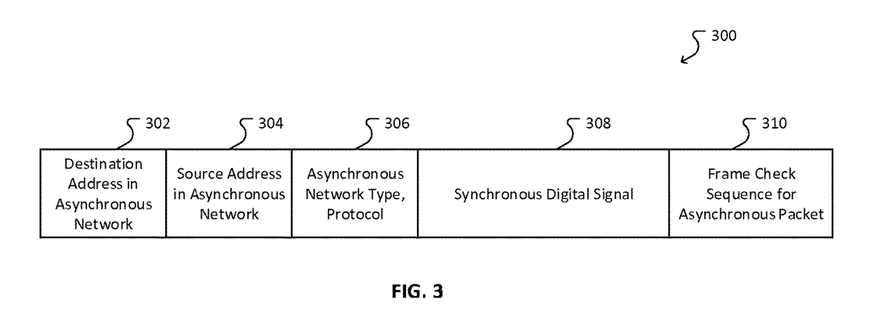
FIG. 3 is a diagram of an asynchronous packet that encapsulates a synchronous digital signal.

FIG. 3 is a diagram of an asynchronous packet 300 that encapsulates a synchronous digital signal. The asynchronous packet 300 may include a number of information fields such as a field of destination address in asynchronous network 302 indicating an address in the asynchronous network for the destination device of the asynchronous packet 300, a field of source address in asynchronous network 304 indicating an address in the asynchronous network for the source device of the asynchronous packet 300, a field of asynchronous network type and protocol 306 indicating which protocol is used in the payload of the asynchronous packet 300, a synchronous digital signal 308 that is encapsulated in the payload field of the asynchronous packet 300, and an FCS for asynchronous packet 310 that allows the receiver to detect errors that may have been induced during the transmission of the asynchronous packet 300 across the asynchronous network 26.

Figure 4:
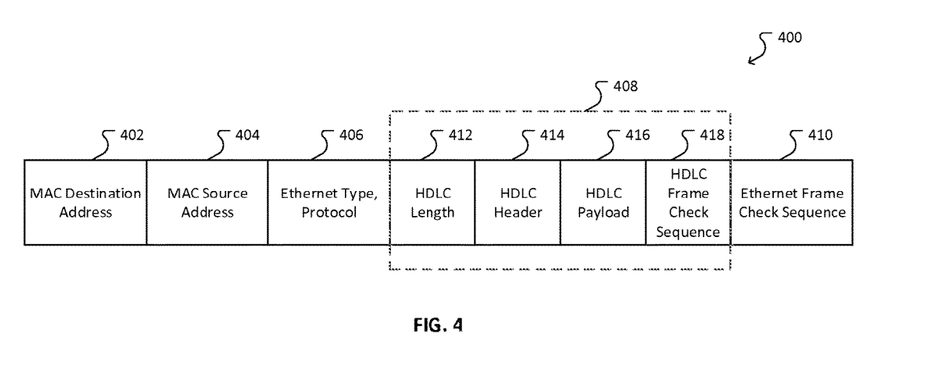
FIG. 4 is a diagram of an Ethernet packet that encapsulates an HDLC signal according to an HDLC/Ethernet implementation.

FIG. 4 is a diagram of an Ethernet packet 400 that encapsulates an HDLC signal according to an HDLC/Ethernet implementation. The asynchronous Ethernet packet 400 may include a number of information fields such as a MAC destination address field 402 indicating an Ethernet address of the destination device for the Ethernet packet 400, a MAC source address field 404 indicating an Ethernet address of the source device for the Ethernet packet 400, an Ethernet type and protocol field 406 indicating which protocol is used in the payload of the Ethernet packet 400, an HDLC frame 408 that is encapsulated in the payload field of the Ethernet packet 400, and an Ethernet FCS 410 that allows the receiver to detect errors that may have been induced during the transmission of the Ethernet packet 400 across the Ethernet network 110.

The HDLC frame 408 may comprise an HDLC signal. The HDLC frame may include a number of information fields such as an HDLC length field 412, an HDLC header 414, an HDLC payload 416 to carry data, and an HDLC frame check sequence (FCS) 418 that allows the receiver to detect errors that may have been induced during the transmission of the HDLC frame. The HDLC length field 412 may include a value equal to the total number of bytes of the HDLC header 414, HDLC payload 416, and HDLC FCS 418. The HDLC header 414 may also include an address field to carry the HDLC address information of the devices associated with the HDLC frame and a control field to carry control information. The address information in the HDLC header 414 may be used to identify the target HDLC device.

In some cases, the HDLC signal in the HDLC frame 408 is generated by one HDLC device. In some cases, the HDLC signal in the HDLC frame 408 is an aggregated HDLC signal from an HDLC bus. The aggregated HDLC signal may include the HDLC signals from individual HDLC devices that are connected to the HDLC bus. For example, the aggregate HDLC signal may be formed by cascading the HDLC signals from individual HDLC devices that are connected to the HDLC bus.

Figure 5:
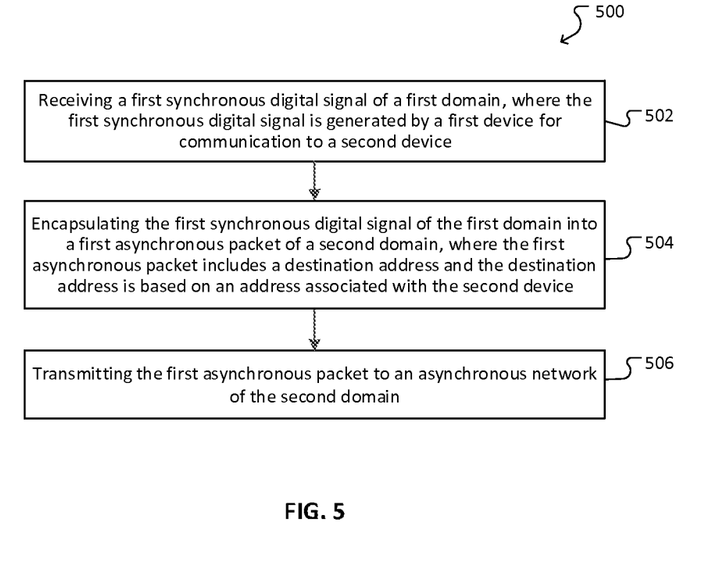
FIG. 5 is a flowchart illustrating an example method for encapsulating a synchronous digital signal into an asynchronous packet.

FIG. 5 is a flowchart illustrating an example method 500 for encapsulating a synchronous digital signal into an asynchronous packet. The method 500 may be performed by one or more processors or circuits. The one or more processors or circuits may be connected or otherwise coupled with a tangible, non-transitory computer-readable medium containing instructions which, when executed, cause the one or more processors or circuits to perform the method 500.

The method 500 begins at block 502, where the deserializer may receive a first synchronous digital signal of a first domain from a synchronous digital bus. The first synchronous digital signal is generated by a first device for communication to a second device. The deserializer may receive the first synchronous digital signal of the first domain from a synchronous digital bus connected to the first device. The deserializer deserializes the received first synchronous digital signal. The deserialized first synchronous digital signal may be stored at a receive buffer.

At block 504, the encapsulator at the inter-domain node may encapsulate the deserialized first synchronous digital signal of the first domain into a first asynchronous packet of a second domain. The encapsulation may be performed by inserting the deserialized first synchronous digital signal of the first domain into the first asynchronous packet of the second domain. The first asynchronous packet may include a destination address and the destination address is based on an address associated with the second device. In some cases, the address associated with the second device may be a MAC address. The address associated with the second device may be an address of the second device, an address of a different inter-domain node connected to the second device, or an address of a transmit buffer associated with a synchronous digital bus connected to the second device.

At block 506, a transmitter associated with the inter-domain node may transmit the first asynchronous packet to an asynchronous network of the second domain. In some cases, the deserializer may receive the first synchronous digital signal of the first domain from a synchronous digital bus connected to the first device, and also receive additional synchronous digital signals of the first domain from the synchronous digital bus. The encapsulator at the inter-domain node may encapsulate the first asynchronous digital signal and the additional synchronous digital signals into a different asynchronous packet of the second domain. The transmitter associated with the inter-domain node may transmit the different asynchronous packet to the asynchronous network of the second domain. In some cases, the first domain is an HDLC domain, the second domain is an Ethernet domain, the synchronous digital signal is an HDLC signal, and the asynchronous packet is an Ethernet packet.

Figure 6:
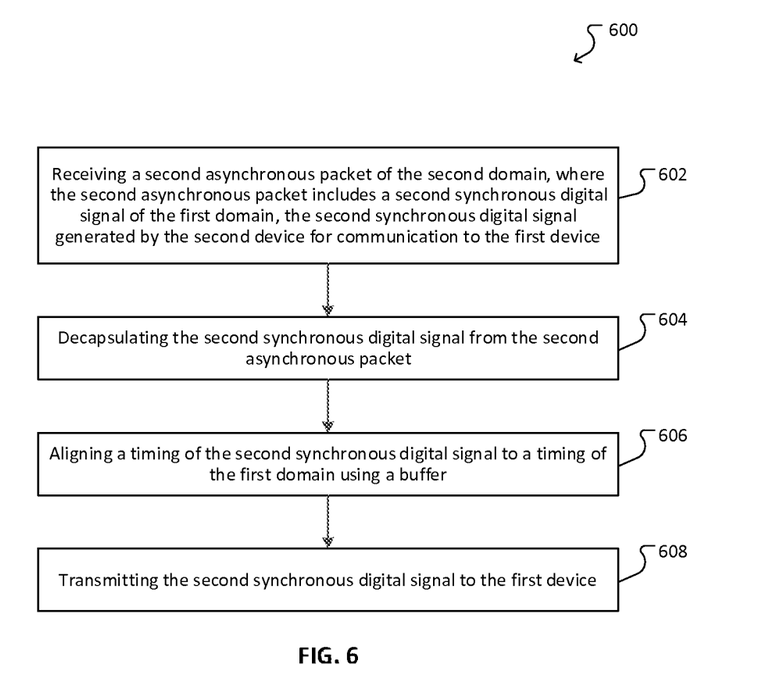
FIG. 6 is a flowchart illustrating an example method for decapsulating a synchronous digital signal from an asynchronous packet.

FIG. 6 is a flowchart illustrating an example method 600 for decapsulating a synchronous digital signal from an asynchronous packet. The method 600 can be performed by one or more processors or circuits. The one or more processors or circuits may be connected or otherwise coupled with a tangible, non-transitory computer-readable medium containing instructions which, when executed, cause the one or more processors or circuits to perform the method 600. The method 600 may begin at block 602, where the decapsulator at the inter-domain node may receive a second asynchronous packet of the second domain. The second asynchronous packet includes a second synchronous digital signal of the first domain, and the second synchronous digital signal is generated by the second device for communication to the first device. At block 604, the decapsulator at the inter-domain node may decapsulate the second synchronous digital signal from the second asynchronous packet. The decapsulation may be performed by extracting the second synchronous digital signal from the second asynchronous packet. At block 606, the timing of the second synchronous digital signal may be aligned with the timing of the first domain using a transmit buffer. At block 608, the serializer may serialize the second synchronous digital signal and send the serialized second synchronous digital signal to the first device over a synchronous digital bus. In some cases, the decapsulator at the inter-domain node may, based on a destination address in the second asynchronous packet, classify the second synchronous digital signal within the second asynchronous packet to a transmit buffer associated with a synchronous digital bus connected to the first device.

Figure 7:
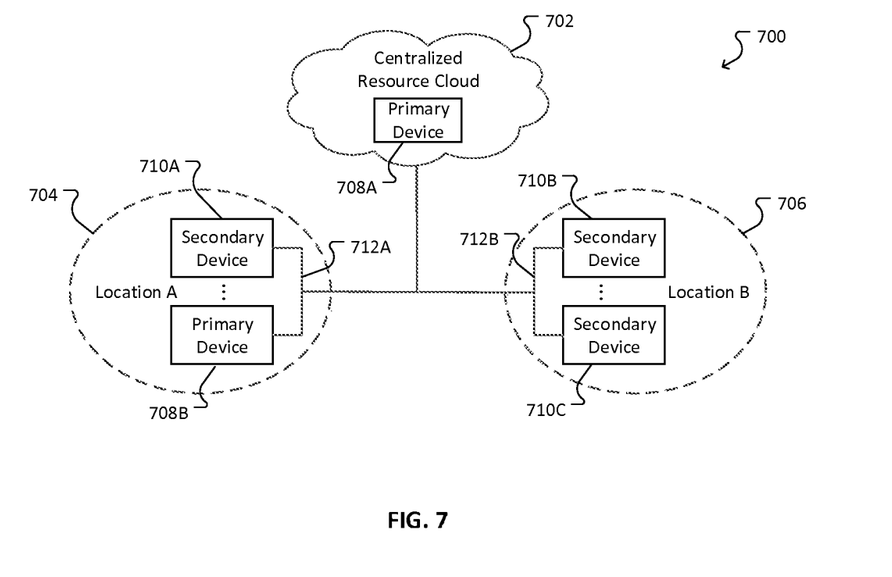
FIG. 7 is a schematic diagram of an example virtualized distributed synchronous digital bus.

FIG. 7 is a diagram of an example a virtualized synchronous digital bus 700. The example virtualized bus 700 may include a primary device 708A (e.g., an HDLC primary device) in a centralized resource cloud 702, a secondary device 710A (e.g., an HDLC secondary device) and a primary device 708B (e.g., an HDLC primary device) connecting to a synchronous digital bus 712A (e.g., an HDLC bus) at a location A 704, and secondary devices 710B and 710C (e.g., HDLC secondary devices) connecting to a synchronous digital bus 712B (e.g., an HDLC bus) at a location B 706. The location of the centralized resource cloud 702, the location A 704, and the location B 706 may be geographically distributed locations. These locations may be connected via an asynchronous network such as an Ethernet network, without synchronous digital links between these locations to deliver synchronous digital signals. Using the example techniques disclosed in this application, the geographically distributed synchronous digital buses can be virtually connected. In some cases, the HDLC primary device 708A and the HDLC buses 712A and 712B, which are geographically distributed without HDLC links between them, can be virtually connected as if there are HDLC links between them to deliver HDLC signals.

For example, the devices connected to the HDLC bus 712A may communicate with the devices connected to the HDLC bus 712B as if there are direct HDLC links between them. The inter-domain node connected with the HDLC bus 712A may receive HDLC signals from the HDLC bus 712A. The inter-domain node may encapsulate the received HDLC signal in an Ethernet packet and add a MAC destination address in the Ethernet packet. Based on the destination address of the Ethernet packet, the Ethernet packet may be delivered to the inter-domain node connected with the HDLC bus 712B via an Ethernet network. Upon receiving the Ethernet packet, the inter-domain node connected with the HDLC bus 712B may decapsulate the HDLC signal from the Ethernet packet and send the extracted HDLC signal to the HDLC bus 712A. Therefore, although there is no HDLC link between the HDLC buses 712A and 712B, the HDLC devices connected to the HDLC bus 712A at the location A 704 may communicate with the HDLC devices connected to the HDLC bus 712B at the location B 706 as if these HDLC devices are on the same digital bus.

Similarly, the HDLC device 708A within the centralized resource cloud 702 may communicate with the HDLC devices outside the centralized resource cloud, e.g., the HDLC devices connected to the HDLC buses 712A and 712B, as if there are HDLC links between them. For example, the HDLC signal generated by the HDLC primary device 708A may be encapsulated in an Ethernet packet.

Based on the destination address of the Ethernet packet, the Ethernet packet may be sent to the inter-domain node connected with the HDLC bus 712A or 712B via an Ethernet network. Upon receiving the Ethernet packet, the inter-domain node connected with the HDLC bus 712A or 712B may extract the HDLC signal from the Ethernet packet and deliver the extracted HDLC signal to the HDLC bus 712A or 712B. Therefore, although there is no HDLC link between the HDLC primary device 708A and the HDLC bus 712A or 712B, the HDLC primary device 708A within the centralized resource cloud may communicate with the HDLC devices outside the centralized resource cloud as if the HDLC primary device 708A and the HDLC devices connected to the HDLC bus 712A or 712B are on the same digital bus. Virtually extending the synchronous digital bus to geographically distributed locations may permit some devices to be moved into the centralized resource cloud (e.g., move the HDLC primary device 708A to the centralized resource cloud) and facilitate technologies such as SDN and NFV.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product (and/or integrated circuit) or packaged into multiple software products (and/or integrated circuits).

The operations described in this specification may be implemented as operations performed by a data processing device on data stored on one or more computer-readable storage devices or received from other sources.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method, comprising:
   receiving, by a first inter-domain device and from a first synchronous digital bus that connects multiple different devices, a first synchronous digital signal that is generated by a first synchronous device connected to the first synchronous digital bus for communication to a second device that is connected to a second synchronous digital bus, wherein the first synchronous digital bus is not directly connected to the second synchronous digital bus, and the first inter-domain device directly connects to an Ethernet network and to a plurality of synchronous digital buses including the first synchronous digital bus;
   encapsulating, by the first inter-domain device, the received first synchronous digital signal into a payload frame of a first asynchronous packet of the Ethernet network, wherein:
      encapsulating the received first synchronous digital signal includes deserializing the received first synchronous digital signal;
      the payload frame of the first asynchronous packet includes a destination address, the destination address is based on an address associated with the second device, and
      the address associated with the second device includes at least one of an address of a second inter-domain device connected to the second device or an address of a transmit buffer associated with the second synchronous digital bus connected to the second device; and
   in response to encapsulating the received first synchronous digital signal into a payload frame of a first asynchronous packet of the Ethernet network, transmitting, by the first inter-domain device, the first asynchronous packet of the Ethernet network, through the Ethernet network, to the second inter-domain device that provides a connection between the Ethernet network and the second synchronous digital bus.

2. The method of claim 1, wherein the address associated with the second device is a media access control (MAC) address.

3. The method of claim 1, further comprising:
   receiving additional synchronous digital signals from the first synchronous digital bus;
   encapsulating the first asynchronous digital signal and the additional synchronous digital signals into a different asynchronous packet; and
   transmitting the different asynchronous packet to the Ethernet network.

4. The method of claim 1, wherein the first synchronous digital bus is in a high-level data link control (HDLC) domain, the first asynchronous packet is transmitted in an Ethernet domain, the first synchronous digital signal is an HDLC signal, and the first asynchronous packet is an Ethernet packet.

5. The method of claim 1, further comprising:
   receiving a second asynchronous packet, wherein the second asynchronous packet includes a second synchronous digital signal, the second synchronous digital signal generated by the second device for communication to the first device;
   decapsulating the second synchronous digital signal from the second asynchronous packet; and
   transmitting the second synchronous digital signal to the first device.

6. The method of claim 5, further comprising classifying, by the first inter-domain device, the second synchronous digital signal within the second asynchronous packet to a transmit buffer associated with the first synchronous digital bus connected to the first device.

7. The method of claim 5, wherein the Ethernet network, directly connects to the first inter-domain device and the second inter-domain device, is a multihop Ethernet network.

8. A telecommunications device, comprising:
one or more computer processors; and
memory storage connected to the one or more computer processors and storing instructions that, when executed by the one or more computer processors, the one or more computer processors perform operations that comprise:
receiving, from a first synchronous digital bus that connects multiple different devices, a first synchronous digital signal that is generated by a first synchronous device connected to the first synchronous digital bus for communication to a second device that is connected to a second synchronous digital bus, wherein the first synchronous digital bus is not directly connected to the second synchronous digital bus, and the telecommunications device directly connects to an Ethernet network and to a plurality of synchronous digital buses including the first synchronous digital bus;
deserializing the first synchronous digital signal via a serial-to-parallel operation, wherein the serial-to-parallel operation includes taking data serially from one input port and outputting the data simultaneously at multiple output ports;
encapsulating the deserialized first synchronous digital signal into a payload frame of a first asynchronous packet of the Ethernet network, wherein:
the payload frame of the first asynchronous packet includes a destination address, the destination address is based on an address associated with the second device, and
the address associated with the second device includes at least one of an address of an inter-domain device connected to the second device or an address of a transmit buffer associated with the second synchronous digital bus connected to the second device; and
in response to encapsulating the deserialized first synchronous digital signal into a payload frame of a first asynchronous packet of the Ethernet network, transmitting the first asynchronous packet of the Ethernet network, through the Ethernet network, to the inter-domain device that provides a connection between the Ethernet network and the second synchronous digital bus.

9. The telecommunications device of claim 8, wherein the address associated with the second device is a media access control (MAC) address.

10. The telecommunications device of claim 8, wherein the one or more computer processors perform operations that further comprise:
receiving additional synchronous digital signals from the first synchronous digital bus;
encapsulating the first asynchronous digital signal and the additional synchronous digital signals into a different asynchronous packet; and
transmitting the different asynchronous packet to the Ethernet network.

11. The telecommunications device of claim 8, wherein the first synchronous digital bus is in a high-level data link control (HDLC) domain, the first asynchronous packet is transmitted in an Ethernet domain, the first synchronous digital signal is an HDLC signal, and the first asynchronous packet is an Ethernet packet.

12. The telecommunications device of claim 8, wherein the one or more computer processors perform operations that further comprise:
receiving a second asynchronous packet, wherein the second asynchronous packet includes a second synchronous digital signal, the second synchronous digital signal generated by the second device for communication to the first device;
decapsulating the second synchronous digital signal from the second asynchronous packet;
aligning a timing of the second synchronous digital signal to a timing of the first synchronous digital bus using a transmit buffer;
serializing the time-aligned second synchronous digital signal via a parallel-to-serial operation, wherein the parallel-to-serial operation includes taking data from multiple input ports and outputting the data in serial at one output port; and
transmitting the second synchronous digital signal to the first device.

13. The telecommunications device of claim 12, wherein the one or more computer processors perform operations that further comprise:
classifying the second synchronous digital signal within the second asynchronous packet to a transmit buffer associated with the first synchronous digital bus connected to the first device.

14. The telecommunications device of claim 8, wherein the one or more computer processors perform operations that further comprise:
storing the deserialized first synchronous digital signal in a receive buffer.

15. A method for extending a synchronous digital bus across an Ethernet network, comprising:
receiving, by a first inter-domain device, synchronous digital signals from a first synchronous digital bus that connects multiple different devices, wherein the first inter-domain device directly connects to a plurality of synchronous digital buses including the first synchronous digital bus;
encapsulating, by the first inter-domain device, the received synchronous digital signals into a payload frame of an asynchronous packet of an Ethernet network, wherein:
encapsulating the received synchronous digital signals includes deserializing the received synchronous digital signals;
the payload frame of the asynchronous packet includes a destination address, the destination address is based on an address associated with a second device that is connected to a second synchronous digital bus, and
the address associated with the second device includes at least one of an address of a second inter-domain device connected to the second device or an address of a transmit buffer associated with the second synchronous digital bus connected to the second device;
in response to encapsulating the received synchronous digital signals into a payload frame of an asynchronous packet of an Ethernet network, transmitting, by the first inter-domain device, the asynchronous packet of the Ethernet network, through the Ethernet network, to the second inter-domain device across the asynchronous Ethernet network, wherein the second inter-domain device provides a connection between the Ethernet network and the second synchronous digital bus;

decapsulating, by the second inter-domain device, the synchronous digital signals from the asynchronous packet; and transmitting, by the second inter-domain device, the synchronous digital signals to the second synchronous digital bus.

16. The method of claim 15, wherein the first synchronous digital bus is in a high-level data link control (HDLC) domain, the asynchronous packet is transmitted in an Ethernet domain, the synchronous digital signals are HDLC signals, the first synchronous digital bus is an HDLC bus, the asynchronous packet is an Ethernet packet, and the Ethernet network is an Ethernet network.

* * * * *

UNITED STATES PATENT AND TRADEMARK OFFICE
CERTIFICATE OF CORRECTION

| | |
|---|---|
| PATENT NO. | : 10,298,725 B2 |
| APPLICATION NO. | : 14/938424 |
| DATED | : May 21, 2019 |
| INVENTOR(S) | : Eric Malcolm Rives, Joseph L. Boyd and Andrew T. Ruble |

It is certified that error appears in the above-identified patent and that said Letters Patent is hereby corrected as shown below:

In the Claims

In Column 17, Line 1, In Claim 7, delete "claim 5," and insert -- claim 1, --, therefor.

In Column 18, Line 64, In Claim 15, delete "asynchronous".

Signed and Sealed this
Sixteenth Day of July, 2019

Andrei Iancu
*Director of the United States Patent and Trademark Office*